United States Patent

Suzuki et al.

[11] Patent Number: 5,875,081
[45] Date of Patent: Feb. 23, 1999

[54] MAGNETIC HEAD

[75] Inventors: Atsushi Suzuki, Miyagi; Masatoshi Hayakawa, Kanagawa; Toru Matsunaga, Miyagi; Takashi Tamura, Miyagi; Akira Urai, Miyagi, all of Japan

[73] Assignee: Sony Corporation, Tokyo, Japan

[21] Appl. No.: 914,900

[22] Filed: Aug. 20, 1997

Related U.S. Application Data

[63] Continuation of Ser. No. 530,712, Sep. 19, 1995, abandoned.

[30] Foreign Application Priority Data

Sep. 21, 1994 [JP] Japan .................................. 6-226233
Dec. 28, 1994 [JP] Japan .................................. 6-328373

[51] Int. Cl.$^6$ ............................ G11B 5/133; G11B 5/187; G11B 5/23
[52] U.S. Cl. ........................ 360/125; 360/122; 360/127
[58] Field of Search .................................. 360/119, 122, 360/125, 126, 127

[56] References Cited

U.S. PATENT DOCUMENTS

| | | | |
|---|---|---|---|
| 3,810,245 | 5/1974 | Ozawa et al. | 360/127 X |
| 4,675,988 | 6/1987 | Matsuzawa | 360/127 X |
| 4,841,400 | 6/1989 | Matsuzawa | 360/125 |
| 4,916,802 | 4/1990 | Matsuzawa | 360/121 X |
| 5,001,588 | 3/1991 | Smukal | 360/119 |
| 5,029,380 | 7/1991 | Smukal | 360/120 X |

FOREIGN PATENT DOCUMENTS

| | | |
|---|---|---|
| A-0 148 014 | 7/1985 | European Pat. Off. . |
| A-0 541 156 | 5/1993 | European Pat. Off. . |
| A-0 628 950 | 12/1994 | European Pat. Off. . |
| 57-53819 | 3/1982 | Japan . |
| 58-68215 | 4/1983 | Japan . |
| 63-209014 | 8/1988 | Japan . |
| 6-111230 | 4/1994 | Japan . |
| A-2 012 468 | 7/1979 | United Kingdom . |

OTHER PUBLICATIONS

Patent Abstracts of Japan, vol. 014, No. 494, (P–1123), Oct. 26, 1990 and JP–A–02 201719 (Mitsumi Electric Co. Ltd.), Aug. 9, 1990.

Patent Abstracts of Japan, vol. 014, No. 005 (E–869), Jan. 9, 1989 and JP–A–01 253210 (NGK Insulators Ltd.), Oct. 9, 1989.

IEEE Transactions on Magnetics, *Hot–Pressed Mn–Zn–Ni and Mn–Zn–Co Ferrites for Magnetic Recording Heads*, Vijay K. Babbar, et al., vol. 28, No. 1, Jan. 1, 1992, pp. 21–26.

*Primary Examiner*—William J. Klimowicz
*Attorney, Agent, or Firm*—Hill & Simpson

[57] ABSTRACT

A magnetic head having a pair of magnetic core halves integrally bonded to each other, each magnetic core half being formed by a single-crystal ferrite piece and a polycrystal ferrite piece bonded together to constitute a junction ferrite, with a magnetic gap being defined between abutting surfaces of the magnetic core halves. The single-crystal ferrite pieces are arranged towards the abutting surfaces of the magnetic core halves and the polycrystal ferrite pieces are arranged on the opposite side of the abutting surfaces with respect to the single-crystal ferrite pieces. Preferably, the surface of the single-crystal ferrite piece having sliding contact with the magnetic recording medium, the gap surface of the single-crystal ferrite piece and the surface of the single-crystal ferrite piece corresponding to the lateral surface of the magnetic head are the (211) plane, (111) plane and the (110) plane, respectively. The directions of the <100>crystal axes within the plane (100) are symmetrical to each other on both sides of the magnetic gap. The magnetic head is low in sliding noise and superior in electro-magnetic conversion characteristics. In addition, the magnetic recording medium is superior in abrasion characteristics since the partial advancing abrasion is prohibited from occurring on its surface configured to have sliding contact with the magnetic recording medium.

3 Claims, 7 Drawing Sheets

5,875,081

1

MAGNETIC HEAD

This is a continuation, of application Ser. No. 08/530,712, filed Sep. 19, 1995 now abandoned.

BACKGROUND OF THE INVENTION

This invention relates to a magnetic head employed for e.g., a video tape recorder. More particularly, it relates to such magnetic head having improved abrasion resistance.

In FIG. 1, there is shown a magnetic head made up of a pair of magnetic core halves 33m, 33n bonded to each other with a magnetic gap g3 defined between abutting surfaces of the magnetic core halves 33m, 33n. The magnetic core halves 33m, 33n are formed by bonding single-crystal ferrite pieces 31m, 31n and polycrystal ferrite pieces 32m, 32n to each other to form a junction ferrite. The magnetic head thus formed has its upper most portion, that is a surface configured for having sliding contact with a magnetic recording medium, constituted by the single-crystal ferrite pieces 31m, 31n, while having its lower most portion, that is its bottom surface, constituted by the polycrystal ferrite pieces 32m, 32n.

With the above-described magnetic head, the magnetic gap g3 formed at the junction portion of the magnetic core halves 33m, 33n and the top of the surfaces of the single-crystal ferrite pieces 31m, 31n on which slides the magnetic recording medium, referred to hereinafter as an R-TOP, are designed to be coincident with each other, so that the magnetic recording medium will be contacted with the magnetic head at the site of the magnetic gap g3.

This type of the magnetic head is effective to reduce the sliding noise since the single-crystal ferrite pieces 31m, 31n are of a small volume and the polycrystal ferrite pieces 32m, 32n take up a major portion of the volume of the magnetic head.

In addition, with such magnetic head, superior electro-magnetic conversion characteristics may be realized by selecting the orientation of the atomic plane of the single-crystal ferrite pieces 31m, 31n so that a surface 31a of the magnetic head on which slides the magnetic recording medium is the (211) plane, the gap surface defined by the abutting surfaces of the magnetic core halves is the (111) plane and the lateral surface 31c corresponding to the lateral surface of the magnetic head is the (110) plane, and by setting the direction A3 of the <100>crystal axis of the single-crystal ferrite piece 31m so as to be symmetrical with respect to the direction A4 of the <100>crystal axis of the opposite-side single-crystal ferrite piece 31n on both sides of the magnetic gap g3.

However, if the direction A3 of the <100>crystal axis of the single-crystal ferrite piece 31m is set so as to be symmetrical with respect to the direction A4 of the <100>crystal axis of the single-crystal ferrite piece 31n on both sides of the magnetic gap g3, as shown in Figs.2 and 3, partial advancing abrasion of the magnetic core half 33m differs from that of the opposite side magnetic core half since the angle of the crystal axis of the single-crystal ferrite core 31m with respect to the sliding direction B of the magnetic recording medium differs from that of the opposite side single-crystal ferrite core 31n, as a result of which partial advancing abrasion, that is an abrasion advancing non-uniformly for the magnetic core halves 33m, 33n, is produced.

If such partial advancing abrasion is produced, a so-called R-TOP offset T is incurred between the position R of the R-TOP and the position G of the magnetic gap g3, as shown in FIGS. 2 and 3, so that the position G of the magnetic gap g3 becomes non-coincident with the position R of the R-TOP thus deteriorating abutting contact between the magnetic recording medium and the magnetic head. That is, the contact position between the magnetic recording medium and the magnetic head is an offset position R due to the partial advancing wear, so that the magnetic recording medium cannot be contacted with the magnetic head at the site of the magnetic gap g3.

OBJECT AND SUMMARY OF THE INVENTION

It is therefore an object of the present invention to provide a magnetic head having low sliding noise and superior electro-magnetic conversion characteristics and superior wear characteristics through prevention of the partial advancing wear of the slide surface for the magnetic recording medium.

The present invention provides a magnetic head having a pair of magnetic core halves integrally bonded to each other, each magnetic core half being formed by a single-crystal ferrite piece and a polycrystal ferrite piece bonded together to constitute a junction ferrite, with a magnetic gap being defined between abutting surfaces of the magnetic core halves. The single-crystal ferrite pieces are arranged towards the abutting surfaces of the magnetic core halves and the polycrystal ferrite pieces are arranged on the opposite side of the abutting surfaces with respect to the single-crystal ferrite pieces.

Preferably, the surface of the single-crystal ferrite piece having sliding contact with the magnetic recording medium is the (211) plane, while the gap surface thereof is the (111) plane and the surface thereof corresponding to the lateral surface of the magnetic head is the (100) plane. The directions of the <100>crystal axes within the plane (100) are symmetrical to each other on both sides of the magnetic gap.

Meanwhile, there exist numerous pores in the polycrystal ferrite. If, when the polycrystal ferrite is exposed on the surface of the magnetic head configured for having sliding contact with the recording medium, there exist pores in the polycrystal ferrite, the sliding characteristics of the recording medium tend to be deteriorated due to these pores. It is therefore preferred to use polycrystal ferrite in which the number of the pores is diminished. Specifically, it is preferred to use polycrystal ferrite having its pores reduced in number by being previously processed with hot isostatic pressing.

The magnetic head of the present invention may be any magnetic head on the condition that a pair of magnetic core halves are integrally bonded to-each-other and a magnetic gap is formed between abutting surfaces of the magnetic core halves. Thus the magnetic head may be of a so-called metal-in-gap type in which a thin magnetic metal film is arranged on abutting surfaces of the magnetic core halves, or of a so-called tilted sendust sputter type in which a thin magnetic metal film is arranged on each of I-he abutting surfaces of the magnetic core halves and the boundary surface between the magnetic core half and the thin magnetic metal film is inclined at a pre-set angle relative to the magnetic gap surface.

With the magnetic head of the present invention, since the major portion of the surface thereof configured for having sliding contact with the magnetic recording medium, excepting the region in the vicinity of the magnetic gap, is formed of polycrystal ferrite which undergoes uniform abrasion, so that the two magnetic core halves exhibit substantially equal abrasion characteristics. The result is that the two magnetic core halves are worn out equally and hence are not subjected to partial advancing abrasion.

On the other hand., if the polycrystal ferrite processed with hot isostatic pressing is employed, since there exist scarcely any pores in the polycrystal ferrite, there is no risk of pore edges scratching the surface of the magnetic recording medium, or the spacing being produced due to the magnetic powders clogging the pores, so that satisfactory slide contact characteristics of the recording medium may be achieved.

In addition, since the junction ferrite formed by bonding the single crystal ferrite and polycrystal ferrite is employed in the magnetic head of the present invention, the slide noise may be suppressed to a lower value. In particular, if the magnetic gap is formed by a single-crystal ferrite in which its surface having sliding contact with the magnetic recording medium is the (211) plane, its magnetic gap surface, representing an abutting surface of the magnetic core half, is the (111) plane and its surface corresponding to the lateral side of the magnetic head is the (110) plane, and in which the directions of the <100>crystal axes in the plane (100) corresponding to the lateral surface of the magnetic head axes are symmetrical to each other on both sides of the magnetic gap, superior electro-magnetic conversion characteristics may be achieved.

In sum, with the magnetic head of the present invention, since the magnetic core halves exhibit substantially equal abrasion resistance characteristics, and undergo abrasion in a similar manner to each other, there is no risk of partial advancing wear so that satisfactory abrasion characteristics may be achieved.

If the polycrystal ferrite is processed by HIP processing, there exist scarcely any pores in the polycrystal ferrite portion of the magnetic head, so that excellent sliding characteristics of the recording medium may be realized even although the polycrystal ferrite is exposed on the surface of the magnetic head adapted to have sliding contact with the magnetic recording medium.

In addition, since the magnetic head of the present invention utilizes a junction ferrite, it becomes possible to suppress the slide contact noise to a small value and to achieve satisfactory slide contact characteristics of the recording medium.

DESCRIPTION OF PREFERRED EMBODIMENTS

Figure 1:
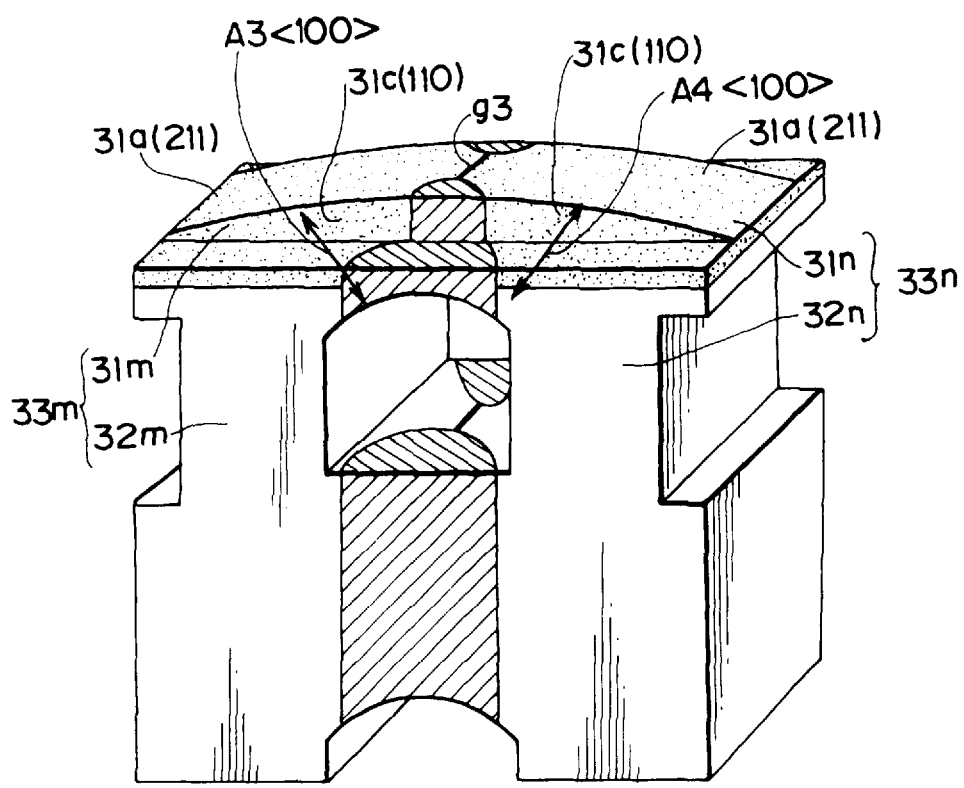
FIG. 1 is a schematic perspective view showing a typical conventional magnetic head.
Figure 2:
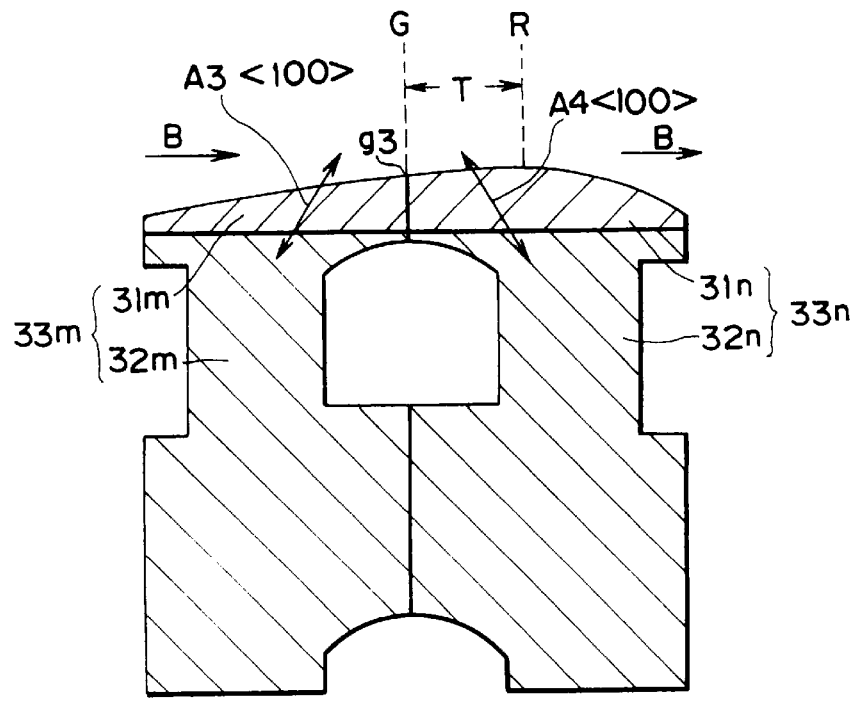
FIG. 2 is a transverse cross-sectional view showing a typical conventional magnetic head which has undergone partial advancing wear.
Figure 3:
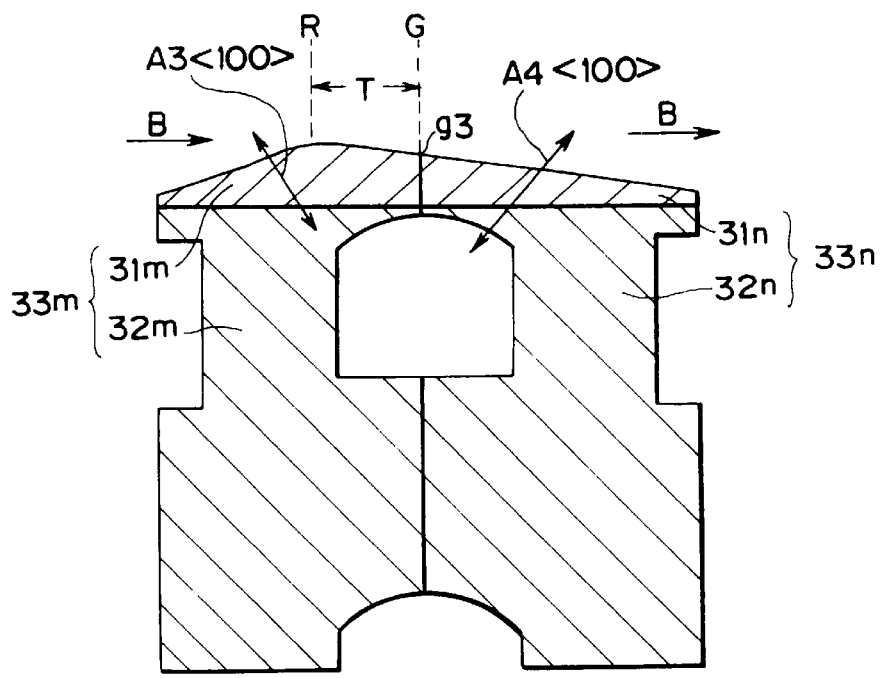
FIG. 3 is a transverse cross-sectional view showing another typical conventional magnetic head which has undergone partial advancing wear.

Referring to the drawings, preferred embodiments of the present invention will be described in detail.

First Embodiment

Figure 4:
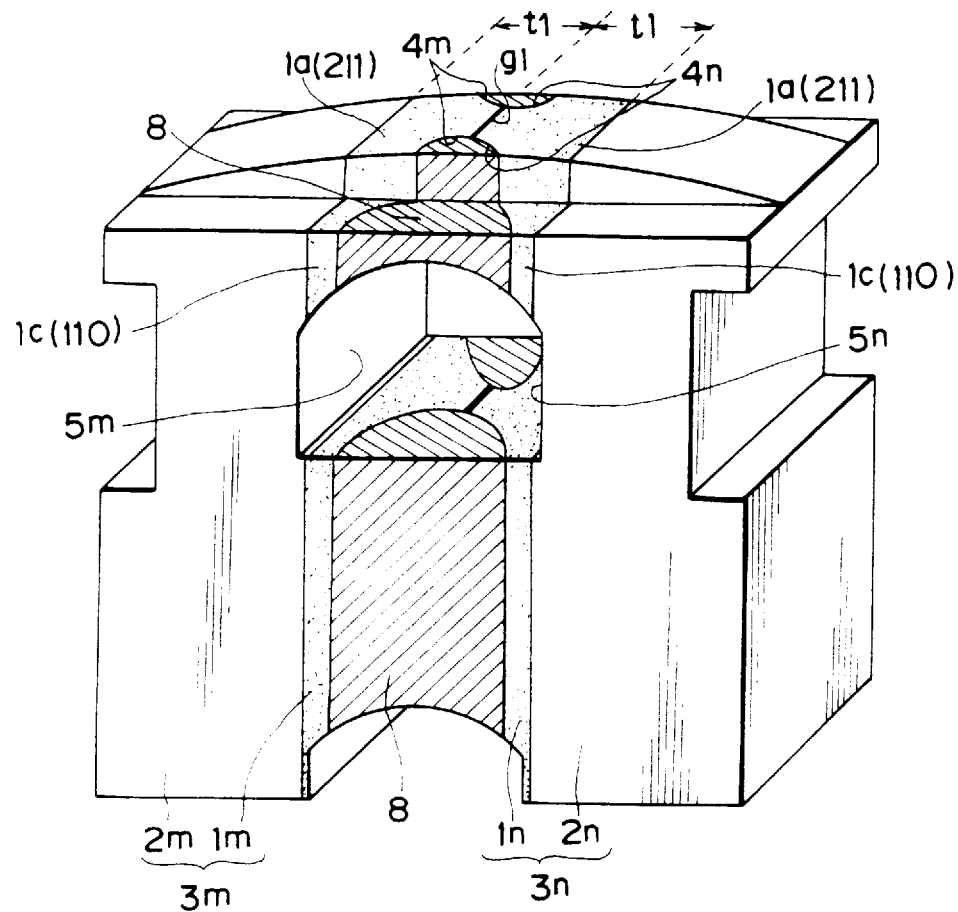
FIG. 4 is a schematic perspective view showing a typical constitution of a magnetic head according to the present invention.

The magnetic head of the present embodiment is comprised of a pair of magnetic care halves 3m, 3n, as shown in FIG. 4. The magnetic core half 3m is comprised of junction ferrite made up of a single-crystal ferrite piece 1m and a polycrystal ferrite piece 2m bonded to each other, while the magnetic core half 3n is comprised of junction ferrite made up of a single-crystal ferrite piece in and a polycrystal ferrite piece 2n bonded to each other. The magnetic core halves 3m, 3n, thus bonded together, constitute a closed magnetic path. Between the abutting surfaces of the magnetic core halves 3m, 3n, there is defined a magnetic gap g1, with a pre-set azimuth angle, for operating as a recording playback gap.

For delimiting the track width of the magnetic gap g1, the magnetic core halves 3m, 3n are formed with track width control grooves 4m, 4n, respectively, on both lateral sides of the magnetic gap g1, so that the abutting surfaces of the magnetic core halves 3m, 3n will be substantially trapezoidal in configuration. The trapezoidal shape is defined by a flat side defined by the flat gap forming surface defining the magnetic gap g1 and by the track width control grooves 4m, 4n which are inclined curved surfaces in both lateral sides of the gap forming surface. The abutting surfaces of the magnetic core halves 3m, 3n are formed with substantially rectangular grooves as winding slots 5m, 5n, respectively, for placing coils, not shown. These winding slots are formed as through-slots extending along the thickness of the magnetic core in the magnetic core halves 3m, 3n, respectively, for facing each other. The magnetic core halves 3m, 3n are unified to each other by fused glass 8.

The junction surfaces between the single-crystal ferrite pieces 1m, 1n and the polycrystal ferrite pieces 2m, 2n, constituting the magnetic core halves 3m, 3n, run parallel to the gap surface which represents the abutting surface of the magnetic core halves 3m, 3n, with the single-crystal ferrite pieces 1m, 1n and the polycrystal ferrite pieces 2m, 2n being on the abutting surfaces and on the opposite side surfaces of the magnetic core halves 3m, 3n, respectively. Thus a portion near the magnetic gap g1 and the remaining portion of the surface of the magnetic head contacted by the magnetic recording medium are constituted by the single-crystal ferrite pieces 1m, 1n and by the polycrystal ferrite pieces 2m, 2n, respectively.

The distance between the junction surface of the single-crystal ferrite pieces 1m, 1n and the polycrystal ferrite pieces 2m, 2n and the gap surface, that is the thickness t1 of the single-crystal ferrite piece 1m or 1n, is selected to be smaller than the abutting length of the magnetic recording medium to the magnetic head along the sliding direction of the magnetic recording medium relative to the magnetic head. The reason therefor is that, for prohibiting partial advancing wear, the magnetic recording medium is configured to slide not only in contact with the vicinity of the magnetic gap g1 delimited by the single-crystal ferrite pieces 1m, 1n but also in contact with the polycrystal ferrite pieces 2m, 2n exhibiting equal abrasion characteristics. In the present embodiment, the thickness t1 of each of the single-crystal ferrite pieces 1m, 1n is set to approximately 50 μm.

For achieving satisfactory electro-magnetic conversion characteristics, each of the single-crystal ferrite pieces 1m, 1n is so set that its surface 1a having sliding contact with the magnetic recording medium is the (211) plane, its gap surface 1b is the (111) plane and its lateral surface 1c corresponding to the lateral side of the magnetic head is the (110) plane. In addition, the direction of the <100>crystal axis of the single-crystal ferrite piece 1m is set so as to be symmetrical with respect to the direction of the <100>crystal axis of the single-crystal ferrite piece in with the magnetic gap g1 in-between.

Figure 5:
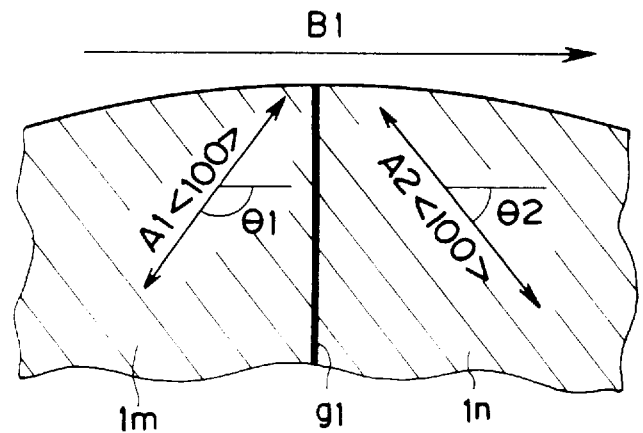
FIG. 5 is a schematic enlarged cross-sectional view showing typical directions of crystal axes of single-crystal ferrite pieces.
Figure 6:
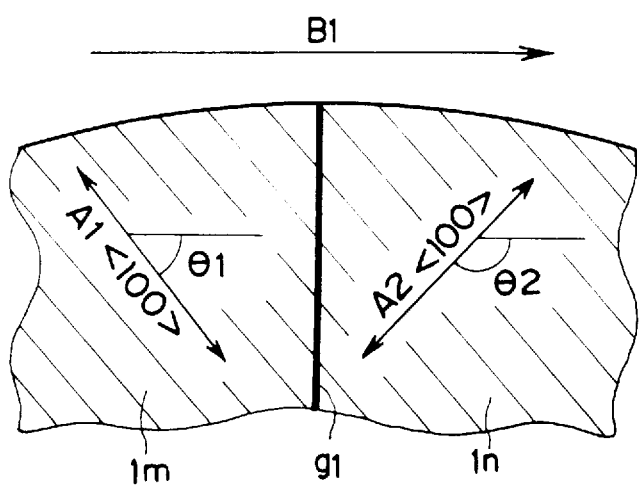
FIG. 6 is a schematic enlarged cross-sectional view showing alternative typical directions of crystal axes of single-crystal ferrite pieces.

Specifically, these directions of the <100>crystal axes are set so that an angle θ1 between the direction A1 of the <100>crystal axis of the single-crystal ferrite 1m of one of the magnetic core halves and the sliding direction B1 of the recording medium is approximately 125 and an angle θ2 between the direction A2 of the <100>crystal axis of the single-crystal ferrite 1n of the remaining magnetic core half and the sliding direction B1 of the recording medium is approximately 55°, as shown in FIG. 5. Conversely, an angle θ1 between the direction A1 of the <100>crystal axis of the single-crystal ferrite 1m of one of the magnetic core halves and the sliding direction B1 of the recording medium is approximately 55° and an angle θ2 between the direction of the <100>crystal axis of the single-crystal ferrite 1n of the remaining magnetic core half and the sliding direction B1 of the recording medium is approximately 125°, as shown in FIG. 6.

Figure 7:
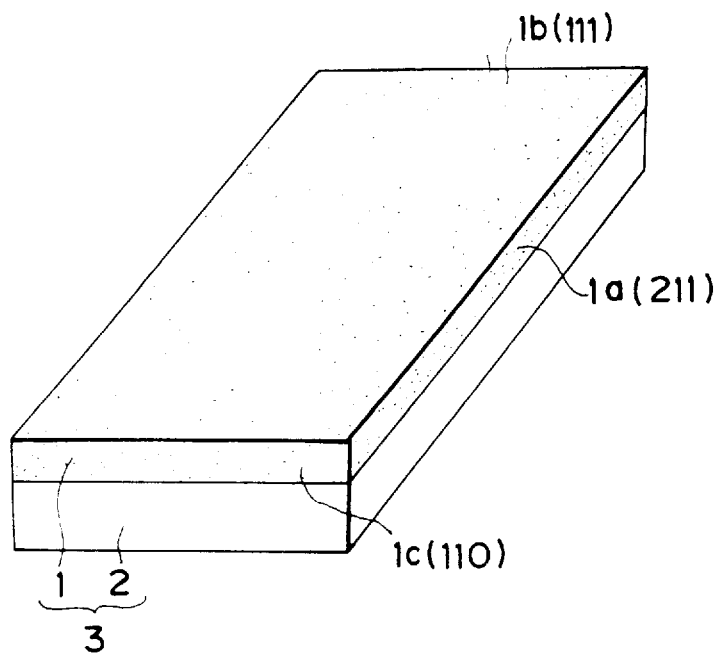
FIG. 7 is a schematic perspective view showing a typical junction ferrite substrate.

For fabricating the magnetic head, a single-crystal ferrite substrate 1 in the form of a flat plate and a polycrystal ferrite substrate 2 in the form of a flat plate are bonded to each other to form a junction ferrite substrate 3 in the form of a flat plate, as shown in FIG. 7. As the single-crystal ferrite substrate 1, a Mn—Zn single-crystal ferrite piece is preferably employed. For bonding the single-crystal ferrite substrate 1 and the polycrystal ferrite substrate 2 together, the single-crystal ferrite substrate 1 is placed so that the sliding contact surface 1a with the recording medium, gap surface 1b and the lateral surface corresponding to the lateral side of the magnetic head 1c correspond to the (211) plane, (111) plane and the (110) plane, respectively, and the single-crystal ferrite substrate 1 is bonded to the polycrystal ferrite substrate 2 so that the resulting junction surface will be parallel to the gap surface 1b. In the present embodiment, the thickness of the single-crystal ferrite substrate 1 is selected to be approximately 50 μm.

Figure 8:
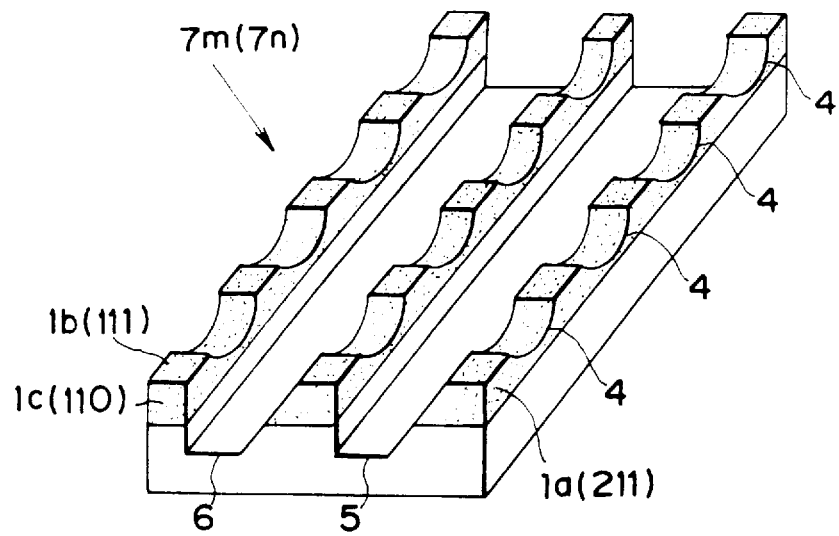
FIG. 8 is a schematic perspective view showing a typical magnetic core half block.

Then, as shown in FIG. 8, a winding slot 5 and a glass charging slot 6 are formed in the gap surface 1b in a direction parallel to the slide contact surface 1a. Then, a plurality of track width control grooves 4 are formed at a pre-set constant pitch in the gap surface 1b in a direction normal to the winding slot 5 and the glass-charging slot 6. The gap surface 1b is then ground to a mirror finish in order to produce a pair of magnetic core half blocks 7m,7n.

The, on the gap surfaces 1b of the magnetic core half blocks 7m, 7n, a gap film, not shown, formed of a non-magnetic material, such as $SiO_2$, is formed. The gap film, formed on the magnetic core half blocks 7m, 7n, is to be a magnetic gap, and has a film thickness equal to one half the gap length of the magnetic head being prepared.

Figure 9:
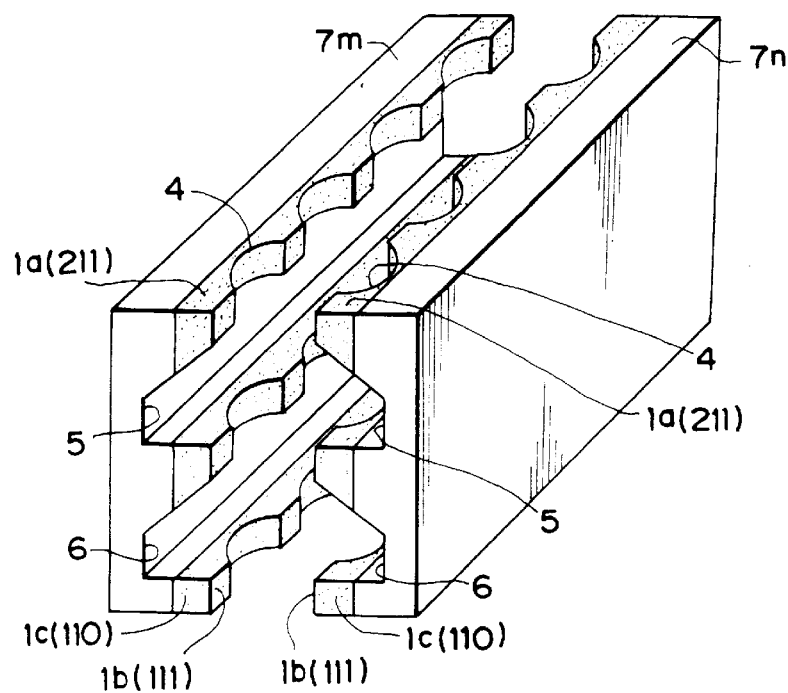
FIG. 9 is a schematic perspective view showing a pair of typical magnetic core half blocks.
Figure 10:
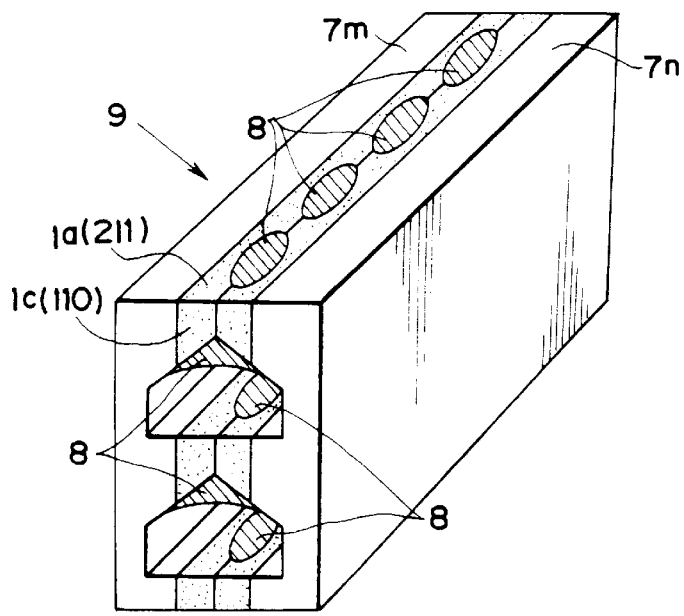
FIG. 10 is a schematic perspective view showing a typical magnetic core block.
Figure 11:
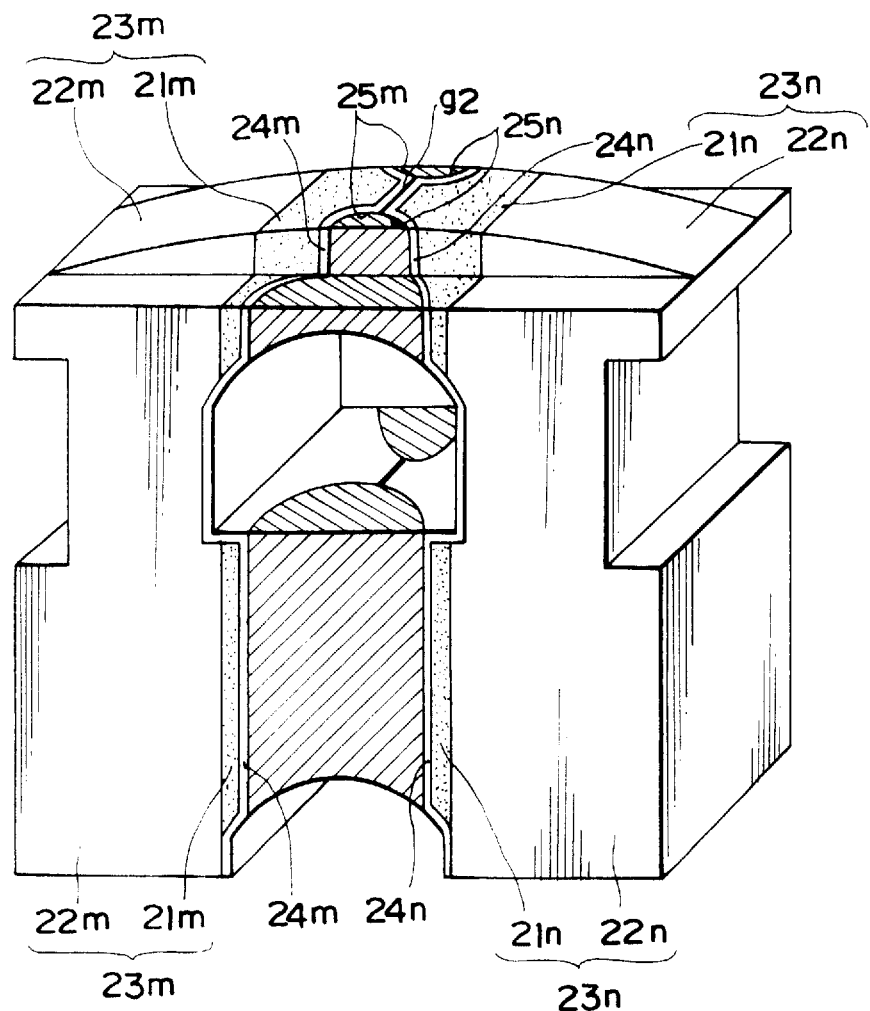
FIG. 11 is a schematic perspective view showing another typical constitution of a magnetic head according to the present invention.

Then, as shown in FIG. 9, the magnetic core half blocks 7m, 7n, thus produced, are placed so that the respective gap surfaces 1b will face each other. Glass rods are inserted in the winding slots 5 facing each other and the glass charging slots 6 similarly facing each other, and are fused, as a result of which the magnetic core half blocks 7m, 7n are bonded to each other by the fused glass rods, as shown in FIG. 10, for forming a magnetic core block 9.

The magnetic core half blocks 7m, 7n may also be fused by low-temperature heat-diffusion bonding by thermal diffusion of metal films, instead of by bonding by glass fusion described above. For bonding the magnetic core half blocks by low-temperature heat diffusion bonding, thin metal films, such as Au films, are formed on the abutting surfaces of the magnetic core half blocks and abutted to each other under a pre-set pressure and under application of a low temperature for heating for effecting the bonding.

The slide contact surface of the magnetic core block 9 is ground to a cylindrical finish, while abutting width control grooves are formed at a pre-set azimuth angle at both ends of the slide contact surface for the magnetic recording medium for delimiting the abutment width of the magnetic recording medium relative to the magnetic head.

The magnetic core block 9 is finally sliced into plural magnetic cores. Each magnetic core, thus sliced out of the magnetic core block, is trimmed to a desired shape in order to produce a magnetic head shown in FIG. 4.

The abrasion characteristics of the magnetic head were evaluated in comparison with a conventional magnetic head. For evaluation, the magnetic heads were mounted on a deck for beta-cam SP manufactured by SONY CORPORATION (machine type, BVW-50) and a magnetic tape for beta-cam SP manufactured by SONY CORPORATION (trade name, BCT-90ML) was run for 24 hours under an environment of 25° C. and 80% RH, and the R-TOP offset, that is the distance between the top of the slide contact surface for the magnetic recording medium and the magnetic gap, was subsequently measured. The R-TOP offset was measured using a interference fringe microscope. The measured results of the R-TOP offset are shown in Table 1.

TABLE 1

|  | magnetic head of Example 1 | conventional magnetic head |
| --- | --- | --- |
| R-TOP offset | 30 μm | 140 μm |

It is seen from the above results that, with the magnetic head of the present embodiment, the R-TOP offset is significantly diminished as compared to that of the conventional magnetic head. That is, the magnetic head of the present embodiment may be said to be less susceptible to partial advancing wear while being excellent in abrasion characteristics.

Second Embodiment

The magnetic head of the present embodiment is a metal-in-gap type magnetic head and is configured similarly to the first embodiment except that thin magnetic metal films 24m, 24n are formed on abutting surfaces of magnetic core halves 23m, 23n. That is, the magnetic head of the present embodiment is fabricated in such a manner that a pair of magnetic core halves 23m, 23n, made up of junction ferrite pieces produced by bonding single-crystal ferrite pieces 21m, 21n and polycrystal ferrite pieces 22m, 22n, are bonded to each other with the interposition of the thin magnetic metal films 24m, 24n formed to the abutting surfaces of the magnetic core halves 23m, 23n. A closed magnetic path is defined by the magnetic core halves 23m, 23n and the thin magnetic metal films 24m, 24n, and a magnetic gap g2 with a pre-set azimuth angle, operating as a recording/playback gap, is formed between these abutting surfaces.

The thin magnetic metal films 24m, 24n are formed on the abutting surfaces of the magnetic core halves 23m, 23n as continuous films extending from the front to the back sides.

That is, the thin magnetic metal films 24m, 24n are formed on the magnetic core halves 23m, 23n as continuous films extending on the magnetic gap forming surfaces and on the track width control grooves 25m, 25n.

As for the material of the thin magnetic metal films 24m, 24n, it is sufficient if it is a magnetic metal material having high saturation magnetic flux density and superior soft magnetic properties. Such material may be enumerated by crystalline materials, such as Fe alloys, Fe—Ni based alloys, Fe—C based alloys, Fe—Al—Si based alloys, Fe—Ga—Si based alloys, Fe—Al—Ge based alloys, Fe—Ga—Ge based alloys, Fe—Si—Ge based alloys, Fe—Co—Si based alloys, Fe—Ru—Ga—Si based alloys or Fe—Co—Si—Al based alloys, and amorphous alloys, such as Co—Zr—Nb, Co—Zr—Nb—Ta, Co—Zr—Pd—Mo or Co—Zr—Pd—Ru alloys. Of course, routinely employed amorphous alloys, such as alloys of one or more elements selected from among Fe, Ni and Co and one or more elements selected from among P, C, B and Si, metal-metalloid based amorphous alloys, mainly composed of these amorphous aBe, Sn, In, Mixed with Al, Be, Sn, In, Mo, W, Tli, Mn, Cr, Zr, Hf and Nb, alloys mainly composed of transition elements, such as Co—Zr or Co—Hf, and metal-metal based amorphous alloys mainly composed of these elements and admixed with rare earth elements, may also be employed.

Although the thin magnetic metal films 24m, 24n may be sole layers, these may also be laminated alternately with non-magnetic insulating layers for diminishing eddy current losses in a high frequency range. In such case, the non-magnetic insulating layers may be formed of such materials as $SiO_2$, $Ta_2O_5$, $Al_2O_3$, $ZrO_2$ or $Si_3O_4$.

For fabricating the magnetic head, a pair of magnetic core half blocks are prepared in the same way as with the first embodiment, and a magnetic metal material is deposited on the gap surface of each-magnetic core half block to a pre-set thickness. The gap film of a non-magnetic material, such as $SiO_2$, may then be formed on the thin magnetic metal film. The magnetic head may be fabricated in the same way as with the first embodiment except forming the thin magnetic metal film in this manner.

With the magnetic head of the present second embodiment, since the slide contact surface for the magnetic recording medium, except the region in the vicinity of the magnetic gap, is formed of polycrystal ferrite which undergoes uniform abrasion, the magnetic core halves exhibit substantially equal resistance against abrasion so that partial advancing abrasion may be prohibited as in the case of the magnetic head of the first embodiment.

Third Embodiment

The magnetic head of the present third embodiment is manufactured in the same way as the magnetic head of the first or second embodiment except employing a polycrystal ferrite processed by hot isostatic pressing (HIP processing).

That is, for producing the magnetic head of the present embodiment, starting ferrite powders are wet-mixed, dried and press-molded to a block of a pre-set size. This block is sintered for about five hours at a temperature of approximately 1300° C. for producing a polycrystal ferrite substrate. Numerous pores of a size on the order of 2 to 5 $\mu$m are present in the polycrystal ferrite substrate. The porosity of the polycrystal ferrite substrate is on the order of 4 to 5%.

This polycrystal ferrite substrate is then processed by HIP processing which is carried out for two to five hours under a pressure of approximately 100 MPa and at a temperature of approximately 1200° C., using e.g., an Ar gas. By such HIP processing of the polycrystal ferrite substrate, the pores are diminished in number, such that the porosity of the polycrystal ferrite substrate is 0.1% or lower.

The polycrystal ferrite substrate, thus processed by HIP processing, and the single-crystal ferrite substrate, are bonded to each other for about three hours under heating at approximately 1100° C., for fabricating a junction ferrite substrate.

Using the junction ferrite substrate, thus prepared, a magnetic head is produced, in the same way as in the first and second embodiments.

With the magnetic head of the present embodiment employing the polycrystal ferrite processed by HIP processing, since there exist scarcely any pores in the polycrystal ferrite portion, there is no risk of damages done to the surface of the magnetic recording medium by pore edges or of spacing produced in the pores due to magnetic powders clogged therein, so that satisfactory sliding characteristics may be assured for the recording medium.

With the magnetic head employing polycrystal ferrite not processed by HIP processing, since its pores are clogged with magnetic powders, it is necessary to run a cleaning tape at an interval of a pre-set time duration on the order of, for example, 50 hours, for cleaning the clogged sliding surface of the magnetic head. With the magnetic head employing polycrystal ferrite processed with HIP processing, there is no risk of the pores being clogged with magnetic powders, so that it is unnecessary to perform such cleaning operation.

What is claimed is:

1. A magnetic head comprising a pair of magnetic core halves integrally bonded to each other, each magnetic core half being formed by a single-crystal ferrite piece and a polycrystal ferrite piece bonded together to constitute a junction ferrite, with a magnetic gap being defined between abutting surfaces of said magnetic core halves, said single-crystal ferrite pieces being arranged towards the abutting surfaces of the magnetic core halves and said polycrystal ferrite pieces being arranged on the opposite side of the abutting surfaces with respect to said single-crystal ferrite pieces, each magnetic core half having a substantially rectangular body with a curved sliding surface which extends above the rectangular body such that the curved sliding surface is positioned between two lands, the magnetic core halves being configured such that when joined a cylindrical sliding surface is formed by said curved sliding surfaces and a shape of said abutting surfaces in the vicinity of said magnetic gap is the same as a shape of said abutting surfaces in the vicinity below a portion provided for windings, track width delimiting grooves being positioned at a preset azimuth angle on opposite sides of the curved sliding surface, said track width delimiting grooves being filled with glass, said cylindrical sliding surface exhibiting substantially uniform wear during uses, wherein, the atomic plane orientation of each of the single-crystal ferrite pieces is selected so that the surface thereof having sliding contact with a magnetic recording medium is the (211) plane, the gap surface thereof functioning as the abutting surface of each of the magnetic core halves is the (111) plane and the surface thereof corresponding to the lateral surface of the magnetic head is the (100) plane, with the directions of the <100>crystal axes within the plane (100) corresponding to the lateral surface of the magnetic head being symmetrical to each other with respect to the magnetic gap; and the orientations of the <100>crystal axes of the magnetic core halves being such that an angle between the direction of the <100>crystal axis of one magnetic core half and the sliding direction of a recording medium is 125° and an angle between the direction of the <100>crystal axis of the other magnetic core half and the sliding direction of the recording medium is 55°.

2. The magnetic head as claimed in claim 1, wherein said polycrystal ferrite piece is a polycrystal ferrite processed with hot isostatic pressing.

3. The magnetic head as claimed in claim 1, wherein a thin magnetic metal film is formed on each of the abutting surfaces of the magnetic core halves.

* * * * *